United States Patent [19]

Thatcher

[11] Patent Number: 4,782,728
[45] Date of Patent: Nov. 8, 1988

[54] AUTOMATIC CUTTER FOR BLOW MOLDED PLASTIC OBJECTS

[76] Inventor: Alan J. Thatcher, 9182 E. Russell St., La Habra, Calif. 90631

[21] Appl. No.: 39,462

[22] Filed: Apr. 16, 1987

[51] Int. Cl.⁴ .................. B26D 1/06; B26D 3/16; B26D 5/20
[52] U.S. Cl. .................. 82/47; 82/18; 82/101; 82/102; 82/24 R; 83/411 R; 264/157; 264/527; 264/536; 425/527
[58] Field of Search .................. 82/18, 46, 47, 101, 82/102, 2.5, 2.7, 24 R; 83/411 R; 264/157, 527, 536; 425/527, 806

[56] References Cited

U.S. PATENT DOCUMENTS

| | | | |
|---|---|---|---|
| 1,698,538 | 1/1929 | Deutsch | 82/18 |
| 3,662,633 | 5/1972 | Bourgeois | 82/101 |
| 3,800,638 | 4/1974 | Duikers et al. | 82/101 |
| 3,906,821 | 9/1975 | Schultz | 82/79 |
| 3,985,221 | 10/1976 | Lueders | 82/102 |
| 4,203,062 | 5/1980 | Bathen | 82/24 R |
| 4,239,071 | 12/1980 | Ritchie | 82/47 |
| 4,538,489 | 9/1985 | Takano | 82/71 |
| 4,549,066 | 10/1985 | Piccioli et al. | 425/527 |
| 4,653,360 | 3/1987 | Compton | 82/18 |

Primary Examiner—Frederick R. Schmidt
Assistant Examiner—William E. Terrell
Attorney, Agent, or Firm—Edgar W. Averill, Jr.

[57] ABSTRACT

An automatic cutter for separating a blow molded plastic object into two parts. The cutter is capable of cutting a rectangular object into two parts. The cutter operates by grasping the blow molded object to be cut and piercing the object with a knife blade or other cutting means such as a laser. The object is then rotated and the height of the cutter is controlled depending upon the degree of rotation and the shape of the object. The method of performing the cutting operation is also disclosed herein.

14 Claims, 3 Drawing Sheets

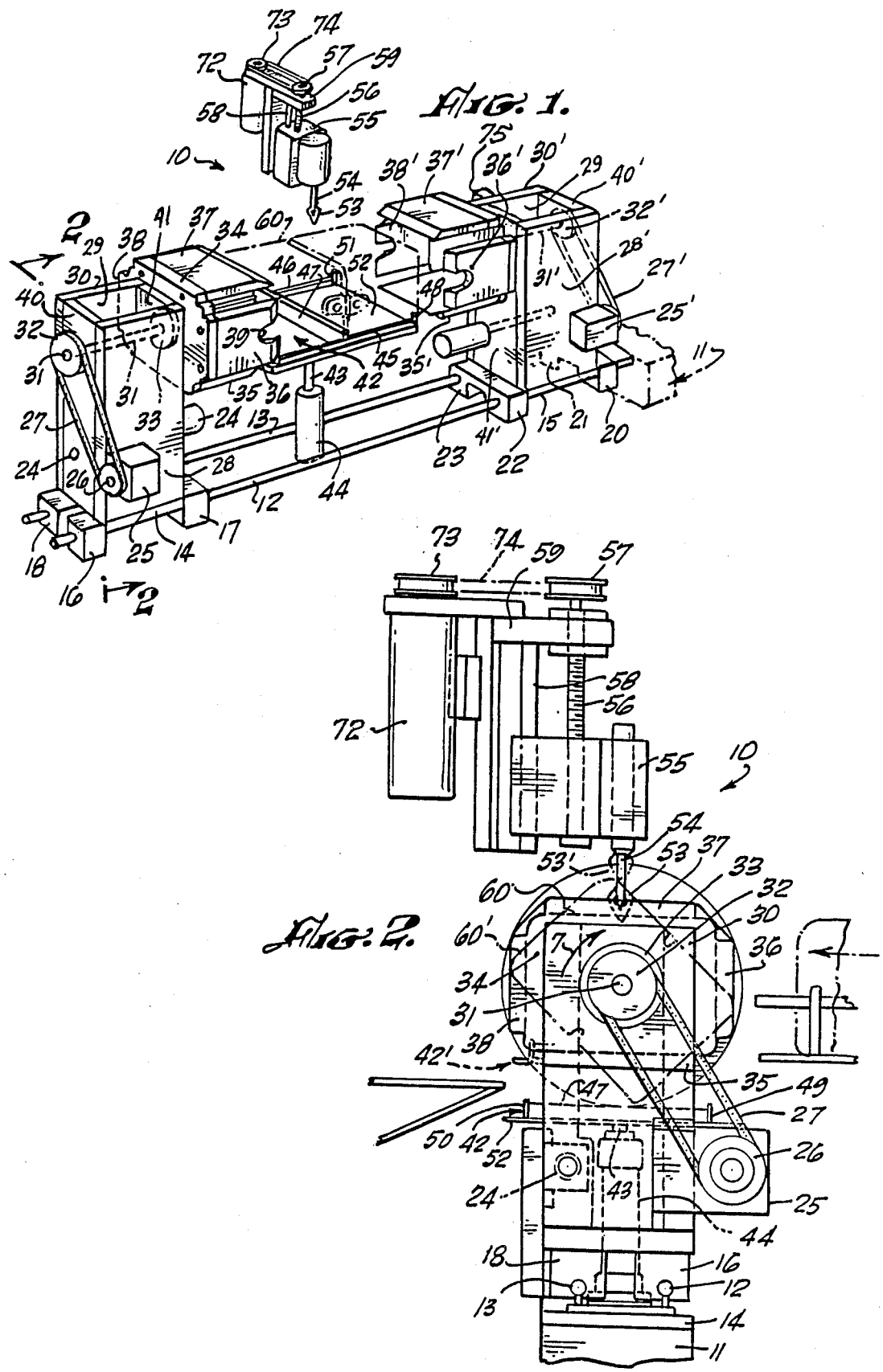

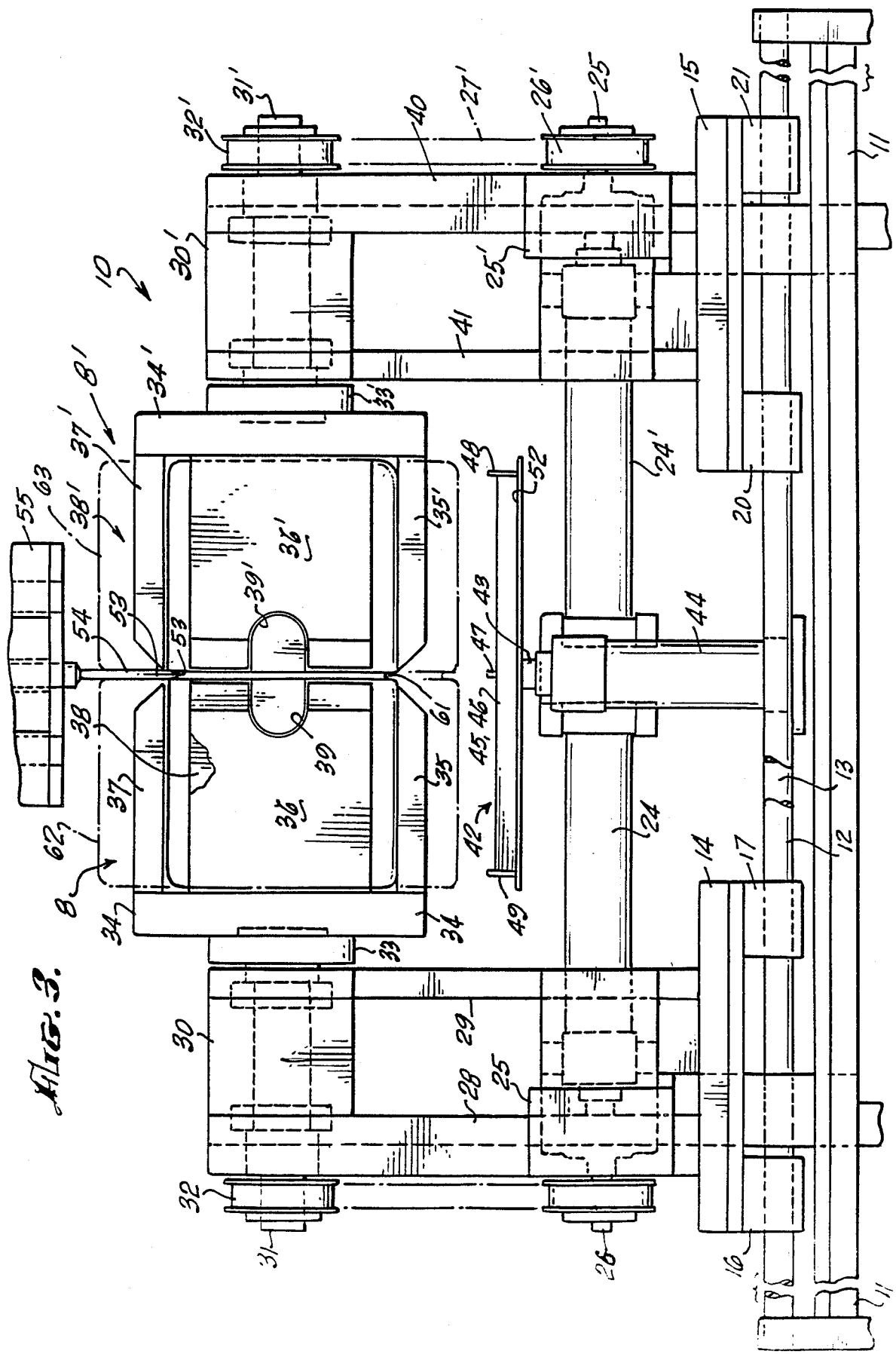

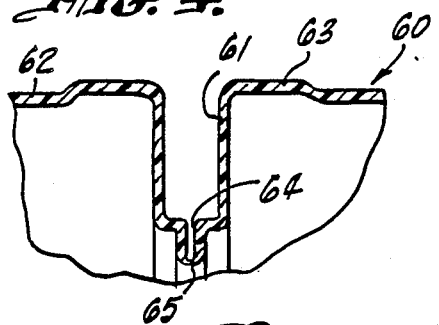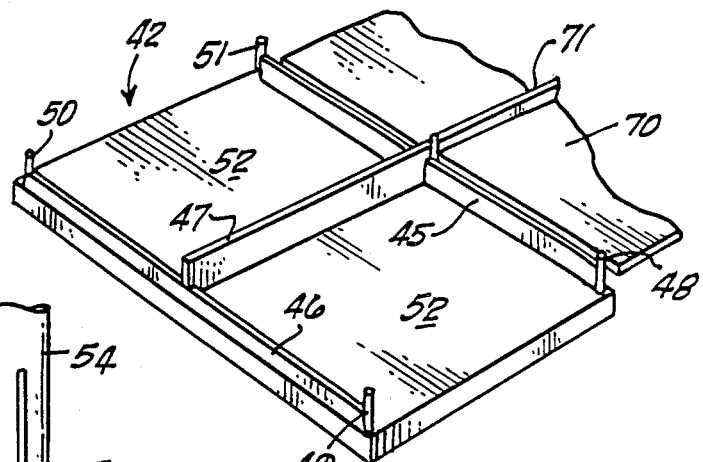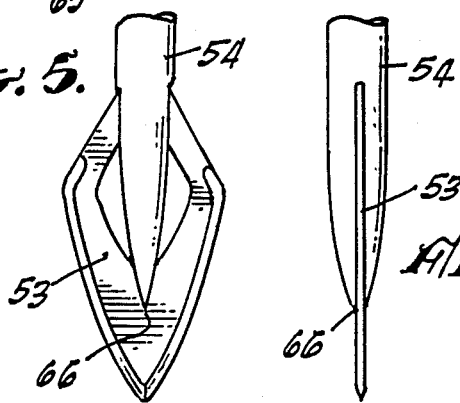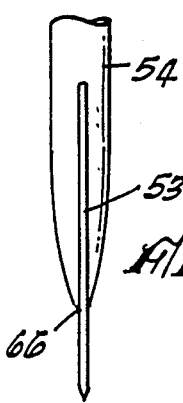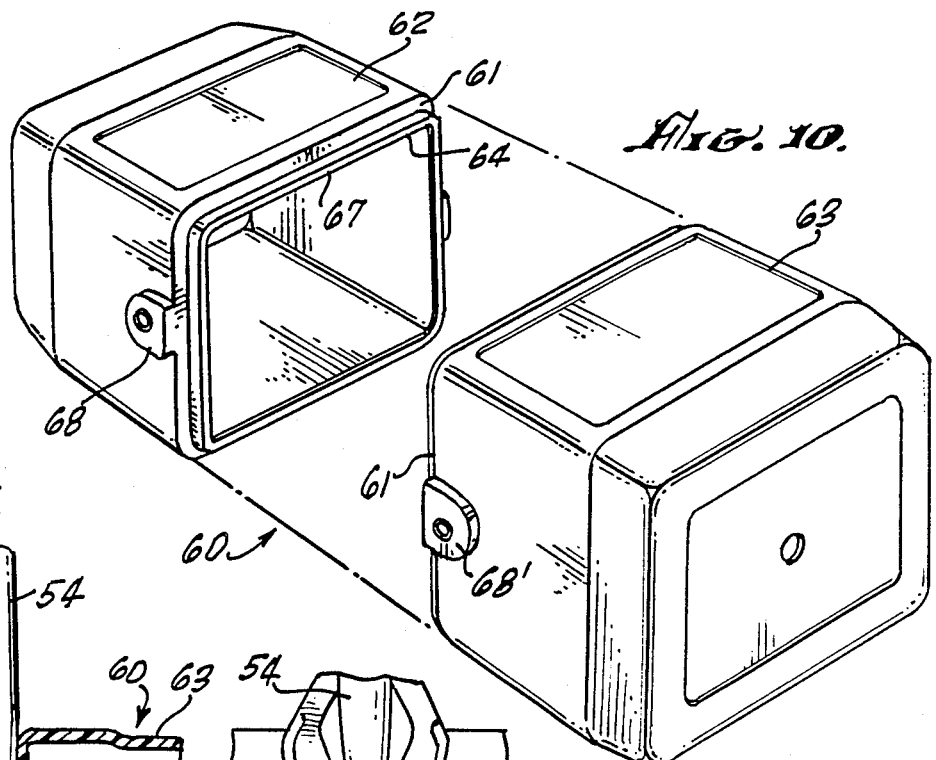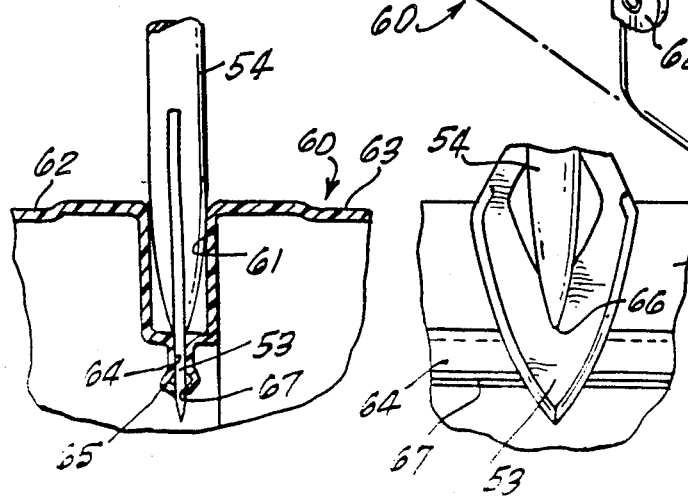

AUTOMATIC CUTTER FOR BLOW MOLDED PLASTIC OBJECTS

BACKGROUND OF THE INVENTION

The field of the invention is plastic fabricating machinery and the invention relates more particularly to machines used to cut or trim hollow, blow molded, plastic objects.

Many cutting operations require a peripheral cut such as a container with a large opening. Also, it has been recognized that it is often efficient to mold two open-faced parts in a face-to-face relationship and then subsequently cut the two halves apart to form two finished blow molded objects. The blow molding operation leaves an opening at the top of the molded object where the air is injected. For those objects where the opening formed by the blow molding operation must be closed, this step may be cut in half since only one of the two parts will have such an opening. Another advantage of face-to-face molding is that the finished part has essentially no waste except for the tabs.

However, the cutting operation necessary to separate the face-to-face halves must be carefully performed and, if done by hand, is labor intensive and often leads to rejected parts by careless cutting. Also, such repetitive movement has been observed to cause a disease of tendons which can be very painful for those so afflicted. While circular parts are relatively easy to cut in two in an automated operation, rectangular or other irregular shapes have resisted attempts to be automated.

SUMMARY OF THE INVENTION

It is an object of the present invention to provide an automatic cutter for separating a blow molded, plastic object into two pieces.

The present invention is for an automatic cutter for separating a blow molded, plastic object into two parts. The blow molded, hollow, plastic object to be cut has first and second portions being attached to each other by a web at the cutting line which lies in a single plane. The automatic cutter has a machine frame which supports first and second portion grasping arms. The first portion grasping arm holds the first portion of the hollow, plastic object and has means for rotating the arm about an axis of rotation which is perpendicular to the plane of the cutting line of the hollow, plastic object. Similarly, the second portion grasping arm holds the second portion of the hollow, plastic object and also includes means for rotating the arm about an axis of rotation which is the same as that of the first portion grasping arm. A cutter assembly means includes a blade, or other cutting means such as a laser, and is mounted on the frame. The assembly includes automatic control means for moving the cutter downwardly into the plane of the cutting line to an extent that the blade pierces the web at the cutting line. The automatic control means controls the height of the cutter as the hollow, plastic object is rotated about the axis of rotation of the grasping arms. Means are provided for moving the first and second portion grasping arms into and out of contact with the blow molded, plastic object. A platform is preferably used to hold the hollow object before it is grasped and the platform is lowered before the rotating step so that it does not interfere with the movement of the object as it is being cut. After the object is cut, the platform is again raised to hold the cut portions. The method of the present invention includes the steps of moving a hollow, plastic object, having an irregular shape at the line of the desired cut, into a cutting position. The hollow, plastic object is then grasped with two grasping arms and a cutter is moved downwardly into the object at the starting point of the cut line. The next step is the rotating of the hollow, plastic object 360 degrees in a manner so that the line of cutting stays in the same plane and the axis of rotation remains the same. The last step is the controlling of the height of the cutter while the object is being rotated.

BRIEF DESCRIPTION OF THE INVENTION

FIG. 1 is a perspective view of the automatic cutter of the present invention

FIG. 2 is a cross-sectional view taken along line 2—2 of FIG. 1.

FIG. 3 is a front view of the grasping arms of the cutter of FIG. 1.

FIG. 4 is an enlarged cross-sectional view of the peripheral groove of the hollow, plastic object to be cut.

FIG. 5 is an enlarged side view of the knife blade of the cutter of 1.

FIG. 6 is a side view of the knife blade of FIG. 5.

FIG. 7 is cross-sectional view of the knife blade inserted into peripheral groove of FIG. 4.

FIG. 8 is a side view of the knife blade and box of FIG. 7.

FIG. 9 is a perspective view of the platform of the cutter of FIG. 1.

FIG. 10 is a perspective view showing both halves of the hollow, plastic object after cutting and separating.

DESCRIPTION OF THE PREFERRED EMBODIMENTS

The cutter of the present invention is shown in FIG. 1 and indicated generally by reference character 10. Cutter 10 has a frame 11 which supports a pair of cylindrical support rods 12 and 13. Support rods 12 and 13 slideably hold a pair of carriages 14 and 15. Carriage 14 is supported by two bearings 16 and 17 which slide on support rod 12 and two bearings 18 and 19 which slide on support rod 13. Similarly, carriage 15 is supported by two bearings 20 and 21 which slide on support rod 12 and two bearings 22 and 23 which slide on support rod 13. The position of carriages 14 and 15 along support rods 12 and 13 is controlled by a piston held in air cylinder 24. Plates 28, 29, 40 and 41 are supported by carriage 14 and hold grasping arm rotation and support assembly 30. A rotatable shaft 31 is connected to a toothed pulley 32 and also to a plate 33 which, in turn, is bolted to grasping arm support plate 34. Grasping arm support plate 34 has four holding plates 35, 36, 37 and 38. Holding plates 36 and 38 have a semi-circular opening 39 which accommodates the handle protrusion of the object to be cut.

Plates 33 and 34, as well as plates 35 through 38, are rotated by the rotation of pulley 32. This rotation is controlled by a servo motor 25 which drives pulley 26. Pulley 26 drives toothed belt 27 which turns pulley 32. The servo motor can cause the grasping arm support plates and holding plates to rotate 360 degrees at a controlled speed. The grasping arm rotation and support assembly, together with the holding plates and other parts on the right-hand side of FIG. 1 are identical to those on the left-hand side and are thus indicated by the same reference characters except with a prime after each reference character. Grasping arm rotation and support assembly 30' is supported by plates 28', 29', 40' and 41' held by carriage 15.

A platform 42 is supported by a piston rod 43 held by a cylinder 44 attached to frame 11. Platform 42 has a pair of object support rails 45 and 46, a central rail 47 and four corner pins 48 through 51. These pins and rails hold the object to be cut off of the surface 52 of platform 42. In this way, holding plates 35 and 35' can move under the object to be cut and grasp it firmly. After the object has been grasped, piston rod 43 is moved downwardly moving the platform assembly downwardly and out of the way of the rotating grasping plates.

As explained in more detail below, after the object has been grasped by the inward movement of the holding plates, the holding plates are rotated 360 degrees and the cutter, such as blade 53, is moved downwardly piercing the object to be cut. It is not necessary that a blade be used as the cutting means and a laser, or other cutter, are equally well utilized by the apparatus of the present invention. Then the object is rotated as the height of the cutter is controlled at a predetermined height so that it follows the cutting line in the object to be cut.

Turning now to FIG. 2, the detail of the cutter support assembly is more clearly shown. In the particular form shown in the drawings, the cutter comprises a knife blade 53. Blade 53 is held on a shaft 54 which is locked into a holder 55. Holder 55 may be moved upwardly and downwardly by the turning of a threaded shaft 56 which is connected to a toothed pulley 57. Holder 55 is also held by a smooth shaft 58 which is affixed to a support arm 59. A servo motor 72 has a shaft to which a toothed pulley 73 is affixed and a toothed belt 74 drives toothed pulley 57 in a controlled manner by controller 75 thereby controlling the height of blade 53. The object to be cut is indicated in a solid line in FIG. 2 by reference character 60 and as the object is turned in the direction as shown by arrow 7, the blade moves upwardly, as indicated by reference character 53', to follow the peripheral edge of object 60. The turning box is indicated by reference character 60'.

As shown in FIG. 3, the grasping arm assembly 8, which includes members 32 through 39, and grasping arm assembly 8', including members 32' through 39', are in a closed position to hold the object to be cut, which will be referred to as a box 60, which has been placed on platform 42. As stated above, box 60 is held off of the surface of platform 42 by the rails and pins thereon as shown more clearly in FIG. 9 of the drawings. The grasping arm assemblies have been moved inwardly by the inward movement of carriages 14 and 15 caused by the turning of threaded shafts 24 and 25 to the position shown in FIG. 3. The platform 42 has been moved downwardly as shown in FIG. 3 after the knife blade 53 has pierced the wall of the box 60. The grasping arm assemblies are then caused to rotate by the turning of toothed pulleys 32 and 32' and the knife blade 53 is controllably held at the desired location in box 60.

The construction of the groove in box 60 can assist in guiding the cutter. This groove lies along the cutting line and is shown in an enlarged view in FIG. 4 where it can be seen that a wide peripheral groove 61 exists between box halves 62 and 63, and a narrow peripheral groove 64 is formed at the base of wide groove 61. The thickness of plastic at point 65 is reduced to a minimum so that the cutting action may be facilitated. This reduced thickness is caused by the blow molding operation and the stretching of the plastic to form peripheral grooves 61 and 64 naturally thins the plastic the greatest amount at point 65.

The detail of the blade construction is shown in FIGS. 5 and 6 where blade 53 can be seen to have a shaft 54 which tapers to a point at 66. As shown in FIG. 6, point 66 is also narrowed so that it smoothly meets the blade 53. Blade 53 is sharpened about its entire edge and, as shown in FIG. 7, extends through point 65 of narrow groove 64. The shaft 54 actually slightly expands wide groove 61 to assist in the guiding of blade 53. The blade is inserted to a depth of approximately that shown in FIG. 8 but, of course, as the box is turned, the height of the blade must be increased or decreased to keep it at a point approximately equal to that shown in FIG. 8. The cut surface is indicated by reference character 67 in FIG. 8.

The cut box is shown in an exploded view in FIG. 10 where the handle flanges 68, 68' and 69 are indicated.

Another feature of the present invention is the means used to guide the uncut box onto the platform. This is accomplished in part by use of a central rail 47 which fits easily within wide groove 61. Prior to moving onto platform 42, the box is moved along a ramp 70 which also has a central rail 71. Ramp 70 is at a height that matches that of platform 42 when platform 42 is in its raised configuration.

After the box has been cut into two halves, the knife moves away and the platform 42 is again raised and the grasping arm assemblies 8 and 9 are opened. The box halves are retained on the platform 42 by pins 48, 49, 50 and 51. An uncut box is then moved along ramp 70 and this pushes the cut box off the other end of platform 42 where it can be further processed.

The control of the height of blade 53 can be programmed so that its height can be set depending upon the rotational angle of the grasping arm assemblies. By so controlling the height, the box can be accurately cut in half with essentially no defective parts. The operation may be automatically carried out once properly programmed.

Although the box shown in the drawings has a generally rectangular cross-section, other shapes may, of course, also be cut since the height of the blade can be programmed in a predetermined manner. A rectangular cut, however, provides far more of a challenge than a circular part. For instance, a pentagon shape could easily be cut as could an irregular shape since the height of the cutter can be programmed in advance. Also, while the drawings depict a part being cut into two equal halves, the device of the present invention can, of course, be used to make any desired peripheral cut.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An automatic cutter for separating a blow molded plastic object into two parts, said cutter and object comprising:

a blow molded, hollow, plastic object having a first portion and a second portion, said first and second portions being attached to each other at a web lying along a cutting line which lies in a single plane and which web is noncircular in the plane of the cutting line;

a cutter machine frame:

a first portion grasping arm affixed to said cutter machine frame, said first portion grasping arm holding said first portion of the hollow, plastic object, said first portion grasping arm including means for rotating said arm and said plastic object about an axis of rotation which is within said plastic object and perpendicular to the plane of the cutting line of the hollow, plastic object;

means for cutting said plastic object including a cutter, said means for cutting being mounted on said frame, said means for cutting including means for moving said cutter upwardly and downwardly into the plane of the cutting line to an extent that the cutter of the means for cutting pierces the web at the cutting line, said means for moving said cutter upwardly and downwardly actively drives the cutter upwardly and downwardly toward and away from the rotational axis of the object so that the cutter maintains cutting contact with the web as the hollow, plastic object is rotated about the axis of rotation of the grasping arms; and means for moving the first portion grasping arm into and out of contact with said blow molded plastic object.

2. The automatic cutter of claim 1 further including a platform, said platform including means for raising and lowering said platform whereby said blow molded, hollow, plastic object may be supported on said platform, then grasped, and then the platform may be lowered so that the object may be rotated without hindrance from the platform and then again raised to hold the first and second portions of the plastic object after they have been severed.

3. The automatic cutter of claim 2 wherein said hollow, plastic object has a peripheral groove at the cutting line and further including a ramp adjacent the platform when the platform is in its raised position, said ramp including a raised center ridge, said ridge fitting in said peripheral groove whereby the hollow, plastic object is oriented in a predetermined desired position.

4. The automatic cutter of claim 3 wherein said platform also has a ridge which mates with the ridge on said ramp.

5. The automatic cutter of claim 1 wherein the blow molded, hollow, plastic object has a generally rectangular shape at the web of the indented groove.

6. The automatic cutter of claim 1 wherein the means for moving said cutter upwardly and downwardly controls the distance of said cutter from the axis of rotation to a predetermined length dependant upon the degree of rotation and the shape of the hollow, plastic object so that the cutter will maintain the desired cutting depth even though the hollow, plastic object is not circular at the cutting line.

7. The automatic cutter of claim 1 wherein said first portion grasping arm is held by a carriage which guides said grasping arm inwardly and outwardly along its axis of rotation.

8. An automatic cutter for separating a blow molded plastic object into two parts, said cutter and object comprising:

a blow molded, hollow, plastic object having an irregular, cross-sectional shape, said hollow, plastic object having a first half and a second half, said first and second halves being attached to each other by a web at the base of an indented, peripheral groove, which groove lies in a single plane and which web is noncircular in the plane of the cutting line;

a cutter machine frame;

a first half grasping arm affixed to said cutter machine frame, said first half grasping arm holding said first half of the hollow, plastic object, said first half grasping arm including means for rotating said arm and said plastic object about an axis of rotation which is perpendicular to the plane of the peripheral groove of the hollow, plastic object, said first half grasping arm having a plurality of plates affixed to a base, said plates fitting closely the exterior of the hollow, plastic object;

a second half grasping arm affixed to said cutter machine frame, said second half grasping arm holding said second half of the hollow, plastic object, said second half grasping arm including means for rotating said arm about an axis of rotation which is the same as the axis of rotation of the first half grasping arm, said second half grasping arm having a plurality of plates affixed to a base, said plates fitting closely the exterior of the hollow, plastic object;

a knife assembly including a blade, said knife assembly being mounted on said frame, said knife assembly including means for actively driving said blade upwardly and downwardly into the plane of the peripheral groove to an extent that the blade of the knife assembly pierces the web at the base of the peripheral groove, said means for actively driving said blade upwardly and downwardly controlling the height of said blade from the rotational axis of the object so that the blade matains cutting contact with the web at the base of said peripheral groove as said hollow, plastic object makes one revolution about the axis of rotation of the grasping arms; and means for moving the first and second half grasping arms inwardly and outwardly along the axis of rotation of the grasping arms thereby moving the grasping arms into and out of contact with said blow molded plastic object.

9. The automatic cutter of claim 8 further including a platform supported by an arm which moves upwardly and downwardly to raise and lower said platform;

said platform holding said hollow, plastic object in a position to be grasped and after the object has been grasped, said arm moves downwardly to lower said platform so that the hollow plastic object can be rotated about the axis of rotation of the grasping arms without interfering with the platform.

10. A method for automatically making a planar cut in a hollow, plastic object having a noncircular shape at the line of cutting, said method comprising the steps of:

moving a hollow, plastic object having a noncircular shape at the line of the desired cut into a cutting position; grasping grasping the hollow plastic object with two grasping arms, the arms being on the opposite sides of the line of the desired cut;

moving a cutter downwardly into the hollow plastic object at the starting point of the cut line;

rotating the hollow, plastic object 360 degrees in a direction so that the line of cutting stays in the same plane and the axis of rotation remains the same; and actively controlling the height of the cutter from the rotational axis of the object while the object is being rotated, said height being a function of the rotational position of the hollow plastic object so that the knife blade stays in a generally constant position with respect to the line of cutting.

11. The method of claim 10 further including the steps of lowering a platform from below the hollow, plastic object after the grasping step.

12. The method of claim 11 further including the step of raising the platform to its supporting position after the controlling step.

13. The method of claim 12 further including the step of retracting the two grasping arms after the raising step and allowing the resulting two cut portions to rest on the platform.

14. The method of claim 13 further including the step of moving the two cut portions off the platform by moving a new, uncut, hollow, plastic object onto the platform.

* * * * *